March 23, 1926.
T. MIDGLEY
BEAD CONSTRUCTION
Filed May 10, 1922
1,578,202
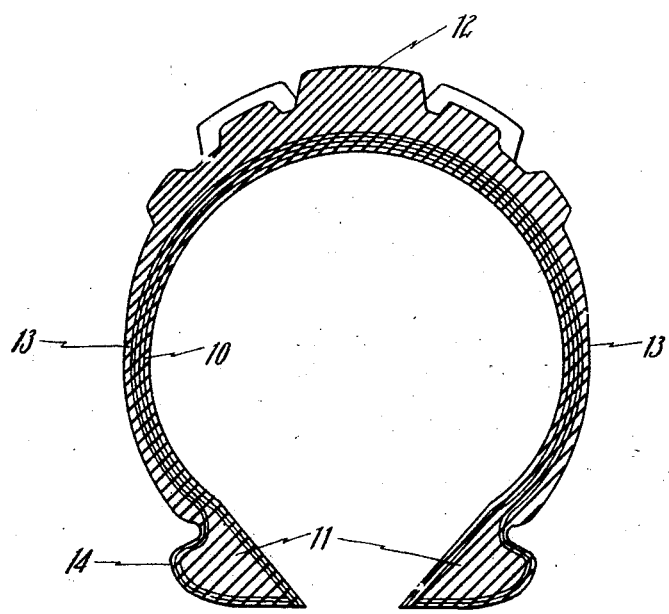
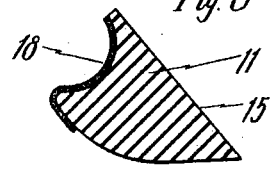
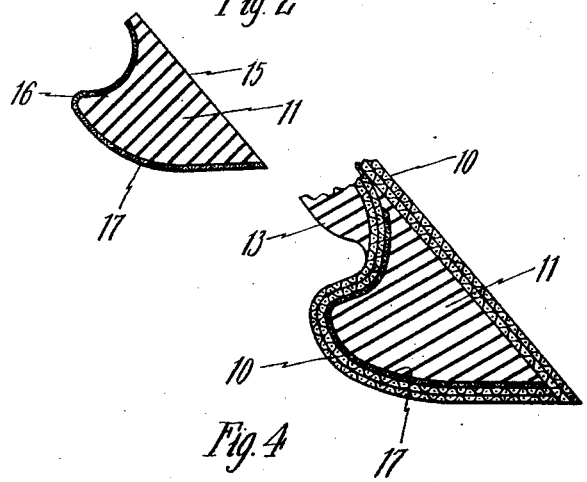
INVENTOR
Thomas Midgley
BY
ATTORNEY Patented Mar. 23, 1926.

1,578,202

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BEAD CONSTRUCTION.

Application filed May 10, 1922. Serial No. 559,804.

*To all whom it may concern:*

Be it known that I, THOMAS MIDGLEY, a citizen of the United States of America, residing at Hampden, in the county of Hampden and State of Massachusetts, have invented certain new and useful Improvements in Bead Construction, of which the following is a specification.

The present invention relates to improvements in the manufacture of tire casings, particularly to that type of tire known as a clincher. It has for its object the improvement in the manufacture of tires of this type in various particulars which will more fully appear below, especially with relation to the filler used in the clincher beads.

The invention will now be described in connection with the accompanying drawings, in which Fig. 1 is a cross section of a tire casing in which the invention may be embodied;

Fig. 2 is a cross section of one form of bead filler for use according to my invention;

Fig. 3 is a similar view of a modified form of a bead filler; and

Fig. 4 is a cross section of a tire bead similar to that at the left in Fig. 1, but on an enlarged scale, showing the disposition of the fabric plies and the bead filler reinforcement.

What are commonly referred to as clincher tires are composed of a plurality of fabric plies 10 shown in the present case as four in number, two of which extend under and two over a bead filler indicated generally in Fig. 1 by 11. The usual covering material such as the tread 12 and the sidewalls 13 are applied over the fabric plies but form no part of my present invention. The bead filler 11, to which my invention particularly relates, is in some instances formed of a semi-hard rubber core completely surrounded by fabric. This fabric forms a considerable expense in the manufacture of a tire, which it has been desired to eliminate. It has been suggested that the fabric covering of the uncured rubber filler could be omitted, but in practice it is found that the omission of this fabric has resulted in distortion of the beads of the tire casing during the operation of molding the tire into final form and also has given rise to difficulties in buffing the bead filler. For these reasons the covering of bead fillers of this general type is at present customary.

I have found that whereas the fabric covering of the bead filler performs certain useful functions in eliminating distortion of the bead filler during molding, it is possible, by placing the fabric according to the present invention, to eliminate a very large proportion of fabric previously thought necessary. The distortion of the filler which occurs during molding is due to the pressure of the partially closed vulcanizing molds upon the point 14 of the bead, and is particularly noticeable in case there is a slight error in alignment of the beads. Bead fillers as customarily manufactured are of substantially the form indicated in Figs. 2 and 3, in which the side which is to go nearest the inner portion of the tire is flat as at 15, and the opposite side has a heel portion 16. The essential point in covering a bead filler according to my invention lies in having this heel portion well protected by fabric before the bead filler is built into the tire between the carcass plies thereof. This may be done either by covering the whole curved surface of the bead filler with a fabric layer 17 as indicated in Fig. 2, or as indicated in Fig. 3 by covering only that portion of the filler adjacent the heel with a fabric layer 18. In either case the side 15 is left uncovered, as a fabric covering at this point is not necessary to accurate molding of the parts. The fabric in either of these examples also serves to protect the heel 16 during buffing, so that an undue amount of rubber will not be removed. The fabric in the example shown in Fig. 2 also protects the toe of the bead. The exact amount of fabric used may be varied according to the desires of the tire builder, the feature of my invention being that the amount of fabric is restricted to that necessary for securing a proper molding without having an excess which accomplishes no useful function in the finished tire. The operations of assembling the tire casing and vulcanizing the same are the same in practicing my invention as in the prior practice, the difference residing in the form of bead filler included.

Having thus described my invention, I claim:

The process of making a clincher tire casing which comprises forming separate bead fillers of rubber compound, said fillers having heel portions adapted to be molded into the form of the heel of the clincher bead, covering the heel portions of the fillers with fabric while leaving the opposite side of the fillers uncovered, incorporating the fillers with the coverings thereon between the edges of the plies of the tire casing so that they serve as anchorages therefor, and vulcanizing the assembled casing under molding pressure to give form and coherence to the beads.

THOMAS MIDGLEY.